US012487812B2

(12) United States Patent
Mair et al.

(10) Patent No.: US 12,487,812 B2
(45) Date of Patent: *Dec. 2, 2025

(54) CONSTRAINT-BASED UPGRADE AND DEPLOYMENT

(71) Applicant: Palantir Technologies Inc., Denver, CO (US)

(72) Inventors: Ian Mair, New York, NY (US); Greg DeArment, Seattle, WA (US); Lee Avital, New York, NY (US); Mark Elliot, London (GB); Michael Nazario, New York, NY (US); Punyashloka Biswal, Norwalk, CT (US); William Hickman, Brooklyn, NY (US)

(73) Assignee: Palantir Technologies Inc., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/112,379

(22) Filed: Feb. 21, 2023

(65) Prior Publication Data

US 2023/0195450 A1 Jun. 22, 2023

Related U.S. Application Data

(63) Continuation of application No. 16/779,137, filed on Jan. 31, 2020, now Pat. No. 11,586,428, which is a (Continued)

(51) Int. Cl.
G06F 8/65 (2018.01)
H04L 67/00 (2022.01)
H04L 67/10 (2022.01)

(52) U.S. Cl.
CPC ............ *G06F 8/65* (2013.01); *H04L 67/10* (2013.01); *H04L 67/34* (2013.01)

(58) Field of Classification Search
None
See application file for complete search history.

(56) References Cited

U.S. PATENT DOCUMENTS 5,835,911 A 11/1998 Nakagawa et al.
6,058,373 A 5/2000 Blinn et al.
(Continued)

FOREIGN PATENT DOCUMENTS

EP 1832976 9/2007

OTHER PUBLICATIONS

Garefalakis Panagiotis et al: "ACaZoo: A Distributed Key-Value Store Based on Replicated LSM-Trees", 2014 IEEE 33rd International Symposium on Reliable Distributed Systems, IEEE, Oct. 6, 2014, pp. 211-220, [retrieved on Dec. 11, 2014].
(Continued)

*Primary Examiner* — Wynuel S Aquino
(74) *Attorney, Agent, or Firm* — Sheppard Mullin Richter & Hampton LLP

(57) ABSTRACT

One or more software products/services may be installed on a cloud deployment. Product versions of such services can be upgraded (or rolled back) based on a deployment plan comprising tasks adapted to reach a target deployment state. A central upgrade server can forward tasks to an upgrade agent for execution, the tasks being based on a current operational state of the cloud deployment (obtained by the upgrade agent) and one or more constraints. In multiple node deployments, some nodes may be upgraded to a new product version, while other nodes are kept at a current product version until stability of the new product version is determined. Traffic across nodes can be shaped to ensure a deployment is healthy before upgrading other nodes/deployments. If the health of a node/deployment does not meet
(Continued)

specified criteria, an upgrade can be stopped, an alert can be triggered, and the node/deployment can be rolled back.

19 Claims, 5 Drawing Sheets

Related U.S. Application Data continuation of application No. 16/269,133, filed on Feb. 6, 2019, now Pat. No. 10,558,454.

(60) Provisional application No. 62/680,400, filed on Jun. 4, 2018.

(56) References Cited

U.S. PATENT DOCUMENTS

| | | | |
|---|---|---|---|
| 6,477,703 | B1 | 11/2002 | Smith et al. |
| 6,836,773 | B2 | 12/2004 | Tamayo et al. |
| 6,854,107 | B2 | 2/2005 | Green et al. |
| 7,100,159 | B2 | 8/2006 | Claiborne |
| 7,322,025 | B2 | 1/2008 | Reddy et al. |
| 8,285,860 | B2 | 10/2012 | McGuire et al. |
| 8,341,619 | B2 | 12/2012 | Pall et al. |
| 8,782,634 | B2 | 7/2014 | Ushiku |
| 8,819,106 | B1 | 8/2014 | Sirota et al. |
| 8,850,528 | B2 | 9/2014 | Van Biljon et al. |
| 8,904,477 | B2 | 12/2014 | Barton et al. |
| 9,195,696 | B2 | 11/2015 | Smith et al. |
| 9,256,657 | B1 | 2/2016 | Evenson et al. |
| 9,256,761 | B1 | 2/2016 | Sahu et al. |
| 9,292,261 | B1 | 3/2016 | Bouldin et al. |
| 9,329,838 | B2 | 5/2016 | Tattrie et al. |
| 9,419,856 | B1 | 8/2016 | Chawla et al. |
| 9,489,190 | B1 * | 11/2016 | Wang ................. G06F 8/65 |
| 9,521,194 | B1 | 12/2016 | Gabrielson |
| 9,805,071 | B1 | 10/2017 | Ellis et al. |
| 9,893,940 | B1 | 2/2018 | Chawla et al. |
| 9,910,697 | B2 | 3/2018 | DeArment |
| 10,263,845 | B2 | 4/2019 | Hall et al. |
| 10,440,153 | B1 | 10/2019 | Smith |
| 2003/0036876 | A1 | 2/2003 | Fuller et al. |
| 2003/0069696 | A1 | 4/2003 | McGeorge et al. |
| 2003/0074256 | A1 | 4/2003 | LaCroix |
| 2004/0044727 | A1 | 3/2004 | Abdelaziz et al. |
| 2005/0144610 | A1 | 6/2005 | Zenz |
| 2005/0228711 | A1 | 10/2005 | Lahey et al. |
| 2005/0257210 | A1 * | 11/2005 | Stienhans ............ G06F 8/65 |
| | | | 717/170 |
| 2006/0031813 | A1 | 2/2006 | Bishop et al. |
| 2006/0229931 | A1 | 10/2006 | Fligler et al. |
| 2007/0005662 | A1 | 1/2007 | Bankston et al. |
| 2007/0005801 | A1 | 1/2007 | Kumar et al. |
| 2007/0016638 | A1 | 1/2007 | Elbury et al. |
| 2007/0050589 | A1 | 3/2007 | Tanaka et al. |
| 2007/0105597 | A1 | 5/2007 | Hwang |
| 2007/0169081 | A1 | 7/2007 | Zhao et al. |
| 2008/0288935 | A1 | 11/2008 | Kawaguchi |
| 2008/0301670 | A1 | 12/2008 | Gouge et al. |
| 2009/0132317 | A1 | 5/2009 | Dholakia et al. |
| 2009/0132710 | A1 | 5/2009 | Pelley |
| 2009/0222808 | A1 | 9/2009 | Faus et al. |
| 2009/0287718 | A1 | 11/2009 | Motoyama et al. |
| 2009/0327465 | A1 | 12/2009 | Flegg et al. |
| 2010/0011098 | A1 | 1/2010 | Sanborn et al. |
| 2010/0049959 | A1 | 2/2010 | Arcese et al. |
| 2010/0054156 | A1 | 3/2010 | DeHaan |
| 2010/0057515 | A1 | 3/2010 | Gandini et al. |
| 2010/0186020 | A1 | 7/2010 | Maddhirala et al. |
| 2010/0235525 | A1 | 9/2010 | McGuire et al. |
| 2011/0131448 | A1 | 6/2011 | Vasil et al. |
| 2011/0209144 | A1 * | 8/2011 | Rowe .................. G06F 8/60 |
| | | | 709/208 |
| 2011/0314462 | A1 | 12/2011 | Clark et al. |
| 2012/0011207 | A1 | 1/2012 | Morris |
| 2012/0180068 | A1 | 7/2012 | Wein et al. |
| 2012/0266155 | A1 | 10/2012 | Valeriano et al. |
| 2013/0070917 | A1 | 3/2013 | Nuestro et al. |
| 2013/0205128 | A1 * | 8/2013 | Thompson .......... H04L 41/0813 |
| | | | 713/1 |
| 2014/0040656 | A1 | 2/2014 | Ho et al. |
| 2014/0059056 | A1 | 2/2014 | Chaney et al. |
| 2014/0149591 | A1 | 5/2014 | Bhattacharya et al. |
| 2014/0237463 | A1 | 8/2014 | Sriram et al. |
| 2014/0310328 | A1 | 10/2014 | Charif et al. |
| 2014/0310493 | A1 | 10/2014 | Pace |
| 2014/0310720 | A1 | 10/2014 | Song et al. |
| 2014/0379777 | A1 | 12/2014 | Yamamoto et al. |
| 2015/0052596 | A1 | 2/2015 | Ayanam et al. |
| 2015/0074053 | A1 | 3/2015 | Sarferaz |
| 2015/0074639 | A1 | 3/2015 | Sanghvi et al. |
| 2015/0074644 | A1 | 3/2015 | Oberheide et al. |
| 2015/0172412 | A1 | 6/2015 | Escriva et al. |
| 2015/0178014 | A1 | 6/2015 | Nelson |
| 2015/0242198 | A1 | 8/2015 | Tobolski et al. |
| 2015/0286475 | A1 * | 10/2015 | Vangelov .................. G06F 8/65 |
| | | | 717/170 |
| 2015/0317361 | A1 | 11/2015 | Battaglia et al. |
| 2015/0350318 | A1 | 12/2015 | Van Assche et al. |
| 2016/0019043 | A1 * | 1/2016 | Ramasamy ............. G06F 8/65 |
| | | | 717/171 |
| 2016/0080489 | A1 | 3/2016 | Ngo et al. |
| 2016/0239281 | A1 | 8/2016 | Avisror et al. |
| 2016/0364286 | A1 * | 12/2016 | Charters ............... G06F 11/008 |
| 2017/0026492 | A1 | 1/2017 | Kawamura et al. |
| 2017/0034023 | A1 * | 2/2017 | Nickolov ........... H04L 43/0817 |
| 2017/0075711 | A1 | 3/2017 | Berranae |
| 2017/0093913 | A1 | 3/2017 | Summers et al. |
| 2017/0097850 | A1 * | 4/2017 | Mitchell ............. G06F 11/3433 |
| 2017/0115978 | A1 | 4/2017 | Modi et al. |
| 2017/0116014 | A1 * | 4/2017 | Yang .................. G06F 9/45558 |
| 2017/0141968 | A1 | 5/2017 | Lloyd et al. |
| 2017/0168900 | A1 * | 6/2017 | Lucas ................ G06F 11/1417 |
| 2017/0285981 | A1 | 10/2017 | DeArment et al. |
| 2017/0285982 | A1 | 10/2017 | DeArment et al. |
| 2017/0308568 | A1 | 10/2017 | Laethem et al. |
| 2017/0371639 | A1 | 12/2017 | Simek et al. |
| 2018/0129654 | A1 | 5/2018 | Ellis et al. |
| 2018/0136960 | A1 * | 5/2018 | Zhang .................. G06F 9/4881 |
| 2018/0137113 | A1 | 5/2018 | Kurz et al. |
| 2018/0139108 | A1 * | 5/2018 | Fulton ..................... H04L 43/20 |
| 2018/0165085 | A1 * | 6/2018 | Carter ...................... G06F 8/60 |
| 2018/0189046 | A1 | 7/2018 | Kunisetty et al. |
| 2018/0189055 | A1 | 7/2018 | Dasgupta et al. |
| 2018/0225017 | A1 | 8/2018 | Latzina et al. |
| 2018/0285090 | A1 | 10/2018 | Das et al. |
| 2018/0302303 | A1 | 10/2018 | Skovron et al. |
| 2018/0324204 | A1 * | 11/2018 | McClory ............... G06F 9/5027 |
| 2018/0337821 | A1 | 11/2018 | Hall et al. |
| 2018/0375891 | A1 * | 12/2018 | Juncker ................... H04L 63/14 |
| 2019/0028331 | A1 * | 1/2019 | Kovacheva .......... H04L 41/0895 |
| 2019/0065158 | A1 | 2/2019 | Varadarajan et al. |
| 2019/0065159 | A1 | 2/2019 | Varadarajan et al. |
| 2019/0227794 | A1 * | 7/2019 | Mercille ................... G06F 8/36 |
| 2019/0250949 | A1 * | 8/2019 | Chen ...................... H04L 47/83 |
| 2019/0391798 | A1 * | 12/2019 | Farrell ................ G06F 11/3672 |

OTHER PUBLICATIONS

Notice of Allowance for U.S. Appl. No. 15/284,957 dated Oct. 25, 2017.

Notice of Allowance for U.S. Appl. No. 15/474,713 dated Jun. 29, 2017.

Notice of Allowance for U.S. Appl. No. 15/284,959 dated May 9, 2019.

Official Communication for European Patent Application No. 18171873.5 dated Nov. 6, 2018.

Official Communication for U.S. Appl. No. 15/284,957 dated Jun. 2, 2017.

Official Communication for U.S. Appl. No. 15/284,957 dated Apr. 3, 2017.

(56) References Cited

OTHER PUBLICATIONS

Official Communication for U.S. Appl. No. 15/284,959 dated Oct. 19, 2017.
Official Communication for U.S. Appl. No. 15/284,959 dated May 8, 2017.
Official Communication for U.S. Appl. No. 15/787,335 dated Dec. 19, 2017.
Official Communication for U.S. Appl. No. 17/178,290.7 dated Nov. 20, 2017.
Official Communication for U.S. Appl. No. 15/284,959 dated Mar. 2, 2018.
Official Communication for U.S. Appl. No. 15/787,335 dated Nov. 22, 2018.
Official Communication for U.S. Appl. No. 15/787,335 dated Jul. 5, 2018.
Official Communication for U.S. Appl. No. 16/365,411 dated May 23, 2019.
Shrivastava et al., "Architectural Support for Dynamic Reconfiguration of Large Scale Distributed Applications," Proceedings of the Architectural Support for Dynamic Reconfiguration of Distributed Systems, May 4, 1998, pp. 1-8.
Extended European Search Report for EP Appln. No. 19177848.9 dated Dec. 19, 2019, 11 pages.
Non-Final Office Action dated Jul. 8, 2021, issued in related U.S. Appl. No. 16/779,137 (26 pages).
Final Office Action dated Dec. 7, 2021, issued in related U.S. Appl. No. 16/779,137 (30 pages).
Non-Final Office Action dated Jul. 11, 2022, issued in related U.S. Appl. No. 16/779,137 (27 pages).
Notice of Allowance mailed Oct. 19, 2022, issued in related U.S. Appl. No. 16/779,137 (8 pages).
Examination Report dated Mar. 9, 2021, issued in related European Patent Application No. 19177848.9 (4 pages).
Second Examination Report dated Apr. 4, 2022, issued in related European Patent Application No. 19177848.9 (3 pages).

\* cited by examiner

CONSTRAINT-BASED UPGRADE AND DEPLOYMENT

CROSS REFERENCE TO RELATED APPLICATIONS

This application is a continuation application of U.S. patent application Ser. No. 16/779,137, filed Jan. 31, 2020, which is a continuation application of U.S. patent application Ser. No. 16/269,133, filed Feb. 6, 2019, now U.S. Pat. No. 10,558,454 B2, which claims the benefit under 35 U.S.C. § 119(e) of the U.S. Provisional Application Ser. No. 62/680,400, filed Jun. 4, 2018, the content of each of which are hereby incorporated by reference in their entirety.

FIELD OF THE INVENTION

This disclosure relates to approaches for controlling and managing upgrades in deployments.

BACKGROUND

Software and/or hardware deployments may be installed, upgraded, and/or otherwise changed. Managing multiple deployments in the context of such installations, upgrades, and/or other changes can be a complex endeavor. For example, services running on one or more deployments may have particular interdependencies that can be broken after a version upgrade to one service is implemented, but not another service. As another example, data migration (transferring data between storage types, formats, or computer systems) may be impacted by upgrades or changes within a deployment. That is, data migration may include converting data from one schema to another schema, and the schema versions may impact dependencies with respect to downstream requests. Moreover, certain data migrations may involve bringing a database system offline/taking it down for some period of time.

SUMMARY

In accordance with one embodiment, a system may comprise one or more processors, and a memory storing instructions. The instructions, when executed by the one or more processors, cause the system to obtain a current status of a cloud deployment based on captured logs reflecting operational characteristics of the cloud deployment. The instructions may further cause the system to transmit the current status to a central upgrade server. Further still, the instructions may further cause the system to receive, from the central upgrade server, a task to be performed at the cloud deployment, the task comprising one of a plurality of tasks commensurate with a target deployment state, and wherein the task has passed a constraint check.

In some embodiments, the logs are formatted in accordance with a specification setting forth compliance criteria.

In some embodiments, the operational characteristics of the cloud deployment comprise at least one of health status of the cloud deployment and performance metrics of the cloud deployment.

In some embodiments, the current status of the cloud deployment includes at least one of a product version running on the cloud deployment and an indication of products installed on the cloud deployment. In some embodiments, the products installed on the cloud deployment comprise at least one of a software service, a software daemon, and a software asset.

In some embodiments, the plurality of tasks maps to a deployment plan defined to arrive at the target deployment state.

In some embodiments, the received task is associated with a first deployment plan that has passed the constraint check, the constraint check comprising a check for at least one of product version compatibility, minimum release channel conflict, maintenance constraints, and downtime constraints.

In some embodiments, one or more products installed on the cloud deployment subscribe to one or more release channels, the one or more release channels controlling a product release rollout. In some embodiments, the one or more release channels comprise product release rollouts associated with product releases having differing levels of stability.

In some embodiments, the central upgrade server obtains information regarding at least one of new products to be installed on the cloud deployment and new product versions of products already installed on the cloud deployment from a configuration repository.

In some embodiments, the task comprises one of a stop task, a change version task, and a start task.

In some embodiments, the plurality of tasks comprise tasks instructing the system to upgrade one or more nodes of the cloud deployment in accordance with target traffic ratio, the target traffic ratio reflecting a first subset of the one or more nodes being upgraded to a new product version and a second subset of the one or more nodes being maintained at a current product version. In some embodiments, the central upgrade server adapts the target traffic ratio depending on a monitored stability of the first subset of the one or more nodes. In some embodiments, the central upgrade server instructs the system to roll-back to a previous product version upon a determination that the health or stability of the first subset of the one or more nodes does not meet a determined threshold.

In accordance with another embodiment, a computer-implemented method may comprise obtaining a current status of a cloud deployment based on captured logs reflecting operational characteristics of the cloud deployment. The computer-implemented method may further comprise transmitting the current status to a central upgrade server. Further still, the computer-implemented method may comprise receiving, from the central upgrade server, a task to be performed at the cloud deployment, the task comprising one of a plurality of tasks commensurate with a target deployment state, and wherein the task has passed a constraint check.

In some embodiments, the operational characteristics of the cloud deployment comprise at least one of health status of the cloud deployment and performance metrics of the cloud deployment.

In some embodiments, the current status of the cloud deployment includes at least one of a product version running on the cloud deployment and an indication of products installed on the cloud deployment.

In some embodiments, obtaining the current status of the cloud deployment based on the captured logs comprises determining a current database schema version. In some embodiments, the task comprises an upgrade task for upgrading the current database schema version to a new database schema version. In some embodiments, the computer-implemented method further comprises, upon determining that a database migration is in progress, postponing the upgrade task for upgrading the current database schema version until the database migration has been completed.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

Figure 1:
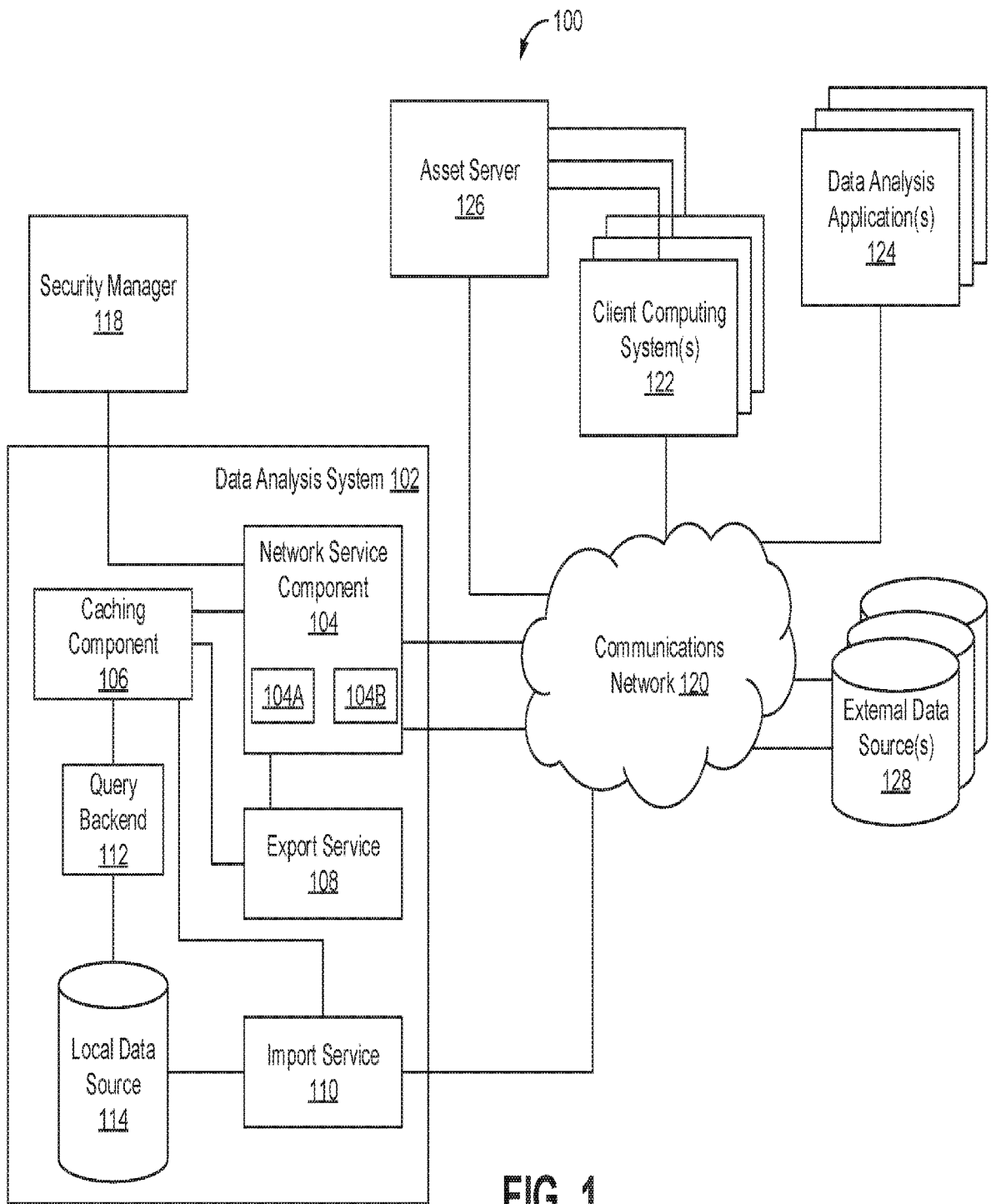
FIG. 1 illustrates a block diagram of an example of data analysis system which may embody a cloud deployment.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Under conventional approaches, software/hardware deployments may be installed, upgraded, and/or otherwise changed at different times by different entities. These deployments may be running different versions of software/services, any one or more of which may have different capabilities or dependencies that can impact operation and/or compatibility. Such issues can complicate the installation, upgrading, or changes involving the deployments, as well as ensuring the health of the deployments.

A claimed solution rooted in computer technology overcomes problems specifically arising in the realm of computer technology. In various implementations, logs and metrics reflecting the characteristics, performance, and health of services running in a deployment can be obtained, e.g., from a collector of such information. A deployment model can be obtained/generated by an upgrade agent based on this information. In some embodiments, the logs and metrics can be obtained from a cloud-based service for deploying, managing, and upgrading software in the deployment. In some embodiments, the aforementioned logs and metrics are made to be compliant with a particular specification so that the logs/metrics can be searchable, analyzed, etc. These logs/metrics can be mapped to or reflected as a current, observed state of the services running in the deployment.

The upgrade agent may relay the current, observed state of the services to a central upgrade server/service, which in turn returns a task back to the upgrade agent. The task can be representative of some granular operation, such as a configuration change, rolling a node(s), performance of an upgrade, product addition, etc. In some embodiments, a deployment plan comprising a series of tasks may be specified describing a particular target state desired for services in a deployment. The deployment plan may be adhered to when assigning tasks to the upgrade agent. In some embodiments, upon receiving information regarding a deployment's current, observed state, the upgrade server/service can perform a constraint check to ensure that any applicable constraints, e.g., minimum/maximum version, dependencies, and/or maintenance/downtime requirements will be met with a next task to be assigned to the upgrade agent. The first deployment plan that meets the applicable constraints can be chosen to be executed.

In some embodiments, a configuration repository can be accessed by the upgrade server/service to discover new versions or configurations of a service, which can be held in a queue. In some embodiments, new versions or configurations of a service can be pushed synchronously, thereby effectuating faster application of the new versions/configurations. In some embodiments, release channels are provided to control the rollout of a particular version release, where nodes/deployments can subscribe to certain release channels. Release channels can have different designations, e.g., stable, where a particular service that is particularly risk averse may only subscribe to a stable release channel. In some embodiments, such release channel designations can be expressed as constraints.

Specifically regarding upgrades, different nodes or deployments may be upgraded to different versions of a service. In some embodiments, traffic across these different nodes can be shaped to ensure the deployment is healthy before upgrading other nodes/deployments. In the event the health of a node/deployment does not meet specified criteria, an upgrade can be stopped, an alert can be triggered, and the node/deployment can be rolled back to a previous (safe) version. In some embodiments, a version of a service can be auto-promoted and considered stable depending on the resulting health of nodes/deployments that have already been upgraded with that version.

Data Analysis Network

FIG. 1 illustrates an example data analysis network 100. Data analysis network 100 may comprise a data analysis system 102 that can include a network service component 104, a caching component 106, an export service 108, an import service 110, a query backend 112, and a local data source 114. Network service component 104 may include an embedded browser component 104A and a widget/plugin component 104B. Data analysis system 102 may be considered an example of a deployment on which various services, e.g., services associated with/effectuating the functionality of network service component 104, export service 108, import service 110, query backend 112, among others.

A security manager 118 may provide capabilities to ensure that users are properly authenticated with the data analysis system 102, as well as other security measures and protocols which may be used by the data analysis system 102 and/or other components or elements of data analysis network 100. In some embodiments, security manager 118 may also be leveraged to ensure one or more data analysis applications 124 have the requisite authority to access certain datasets, whether stored in local data source 114, in external data source(s) 128, etc.

The network service component 104 provides capabilities related to generation, presentation, and in some cases display of the user interfaces, UI components, and related features, e.g., building datasets, viewing query results, providing data analytics visualizations, etc. One or more separate applications or tools, e.g., embodied in data analysis application(s) 124, may provide the data analysis, visualization, and/or rendering functionality applied to one or more datasets to generate the desired data analytics and/or reporting. In embodiments where network services component 104 utilizes a URL to access a visualization generated by one or more data analysis applications 124 in order to render the visualization or a report in a workspace UI by embedding the visualization/report in a mini browser or browser frame, network service component 104 may utilize an embedded browser component 104A. In particular, embedded browser component 104A may access the requisite visualization or report from the appropriate data analysis application(s) 124 via communications network 120 to be embedded.

In embodiments where a widget provides access to one or more data analysis applications 124 in order to allow one or more data analysis applications 124 to interact with the workspace UI to render visualizations and/or reports, network service component 104 may utilize widget/plugin component 104B to effectuate the interaction via, e.g., one or more appropriate APIs. In some embodiments, widgets or plugins may be maintained in asset server 126. For example, a user utilizing one or more client computing systems 122, may create a plugin for invoking a widget associated with one or more data analysis applications 124. The user may, in some embodiments, upload the widget to asset server 126. Asset server 126 may serve the widget or plugin. In some embodiments, a datastore of widgets (created by the user or created by other users) may be maintained in asset server 126, and which a user may add to a report or add to generate a report in a workspace UI.

Asset server 126 is depicted in FIG. 1 as a centralized server, but in other embodiments, asset server 126 is contemplated to be a distributed service implemented via multiple asset servers. It should be noted that data regarding a report and/or data to be included in a report need not be limited to data from datasets maintained in local data source 114. In some embodiments, data can be obtained from one or more external data sources 128 via communications network 120, and can be images, text, metadata, media, and other types of digital data besides data in a dataset of interest being analyzed in accordance with various embodiments. It should also be noted accessing and utilizing of data analysis applications 124, as well as data, e.g., in local data source 114 and/or external data sources 128, can be chained. That is, the data analysis, visualization, and/or rendering functionality of a first data analysis application may depend on the data analysis, visualization and/or rendering functionality of a second data analysis application, and so on. This can be reflected in a widget or plugin, and/or a data analysis application itself. The same holds true for data, e.g., a first URL may point to a first datastore or pointer, which in turn may be used to reference another datastore or pointer, and so on. In some embodiments, one or more of the databases or data sources may be implemented using a relational database as well as other types of databases such as, for example, a flat file database, an entity-relationship database, and object-oriented database, and/or a record-based database.

The caching component 106 can provide capabilities related to, among other things, caching of query results generated for analysis workflow sessions. The caching component 106 may also be configured to manage connection pooling for the data analysis system 102, such that users of the system are mapped to temp tables created for their respective analysis workflows. Among other benefits, this may help improve response times for the users as they may utilize the same connection and same temp tables many times over a single session.

The export service 108 can process requests to export data (as described above) from the data analysis system 102 to, for example, the external data sources(s) 128, working in association with the caching component 106 to access data and provide it to the network service component 104 for export.

The import service 110 may periodically poll or be notified by the external data source(s) 128 when new data may be available for import. When new data is available for import, the import service 110 may update the local data store 114, and provide an indication to the caching component 106 that new data is available. In response, the caching component 106 may purge or invalidate outdated data.

The query backend 134 can provide capabilities related to query optimization including analyzing query filters received from the network service component 104, one or more data analysis applications 124, etc.

The data analysis system 102 and/or its subcomponents are generally controlled and coordinated by an operating system. Conventional operating systems control and schedule computer processes for execution, perform memory management, provide file system, networking, I/O services, and provide a user interface, such as a graphical user interface ("GUI"), among other things.

As illustrated in FIG. 1, data analysis system 102 is electronically coupled to communications network 120, which comprises one or more of a LAN, WAN, and/or the Internet, for example, via a wired, wireless, or combination of wired and wireless, communication link. Various computing devices and/or other electronic devices, such as one or more of the illustrated components or elements of data analysis network 100 via communications network 120 over wired and/or wireless communication links.

In some embodiments, data analysis system 102 can be configured to process queries that are received from various computing devices, e.g., client computing systems 122 and/or data analysis applications 124. As indicated above, queries may involve requesting data that is stored in one or more tables of a database, e.g., local data source 114, or external data source(s) 128, writing new data in the one or more tables of the database, modifying existing data in the one or more tables of the database, and/or deleting existing data in the one or more tables of the database. The computing device 10 can process such queries and provide data that is responsive to the queries. In some instances, the client computing systems 122 may be running one or more data analysis application(s) 124 that have been configured to query data that is stored in a particular database, e.g., e.g., local data source 114, or external data source(s) 128.

In some embodiments, a live migration of data from one database, e.g., a first of database of external of data source(s) 128 to a second database of external data source(s) 128 may involve transferring (or copying) data from one or more tables of the first database to one or more tables of the second database. In some instances, one or more tables of the first database may be configured for a first schema while the corresponding tables in the second database may be configured for a second schema.

In general, when performing a live migration, the data that was available in the database from which data is being migrated, e.g., the first database, including any changes made to the data during the migration, should be remain accessible while the migration is process. Such reliability is typically needed so that existing applications, e.g., data analysis application(s) 124 or resources, e.g., components of data analysis system 102 that rely on the data can continue to operate until those applications/resources have been modified or upgraded to utilize the database (e.g., database schema) to which the data is being migrated, e.g. that of the second database. In various embodiments, the data analysis system 102 (or another computing system) is configured to migrate live data without interrupting the operations of existing applications/resources that rely on the data being migrated.

Upgrade Architecture and Method

Figure 2:
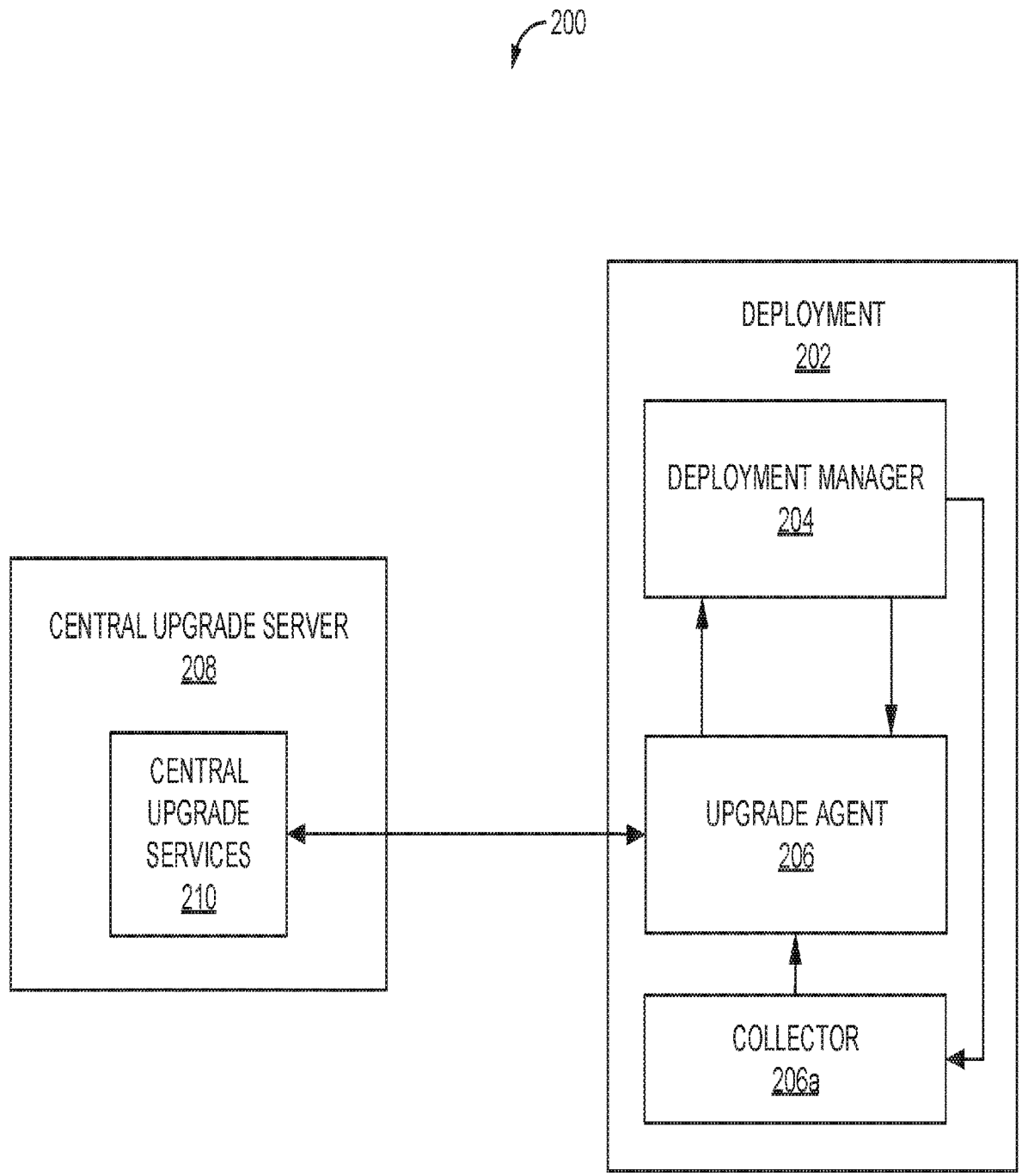
FIG. 2 illustrates a block diagram of an example constraint-based upgrade and deployment architecture for upgrading the example data analysis system of FIG. 1.

FIG. 2 illustrates an example system 200 in which various embodiments may be implemented to perform constraint-based upgrade and deployment. It should be understood that while only a single deployment or deployment node is illustrated for ease of reference, multiple deployment or deployment nodes may upgraded/deployed in accordance with various embodiments. In the illustrated example, deployment 202 may be an embodiment of a data analysis system, such as data analysis system 102 (FIG. 1). In some embodiments, deployment 202 may be operating as an isolated process executing on a platform that can provide confidentiality and integrity of code, data, etc., also referred to as a secure enclave. As indicated above, a deployment may have one or more services running thereon, and a deployment may be upgraded, installed, or otherwise changed. Accordingly, various embodiments provide a mechanism for deploying/upgrading services running in a deployment, e.g., deployment 202.

As illustrated in FIG. 2, deployment 202 may include a deployment manager 204. Deployment manager 204 may comprise a cloud-based service for deploying, managing, and upgrading software in the deployment, i.e., deployment 202. In order to achieve safe upgrades, where dependencies and capabilities of and between the various services are taken into account, an upgrade agent 206 may obtain information regarding the operating characteristics of all the services that are deployed in deployment 202, e.g., the health of the deployed services, current versions of the deployed services, etc. In some embodiments, upgrade agent 206 may obtain a current snapshot of deployment 202 by generating a report of any assets, daemons, and/or services installed in deployment 202, along with current configuration(s), version(s), and/or health information as seen/monitored by deployment manager 204.

In some embodiments, the information regarding the operating characteristics of deployment 202 may be obtained by metrics collector 206a by way of logs captured by deployment manager 204. In some embodiments, deployment manager 204 may configured to generate logs that comply with a logging specification. This logging specification may define certain log types that a service or product emits, specify certain reporting requirements to maintain consistent and standardized logs that can be used to effectuate upgrades, evaluate a service's health, etc. In some embodiments. information comprising the logs may be redacted or deemed to be safe or unsafe, where safe data can be moved within system 200 or to other remote systems and unsafe data cannot. For example, user credentials and tokens may not be logged.

Upon obtaining the current operating characteristics or snapshot information of deployment 200, upgrade agent 206 may transmit the information to an upgrade server 208. In some embodiments, upgrade server 208 may be a cloud deployment operated and maintained by an entity through which deployment 202 may be provided. Upgrade server 208 may host an upgrade services component 210 which, based on the information received from upgrade agent 206, can return some unit of work to be executed by upgrade agent 206 (also referred to as task) by way of deployment manager 204. In some embodiments, a task can be a relatively granular operation associated with an upgrade, installation, or other change to deployment 202, such as importing a product (which may be a service, daemon, or other asset), or changing a target lifecycle status or the configuration of a particular service. Upon receiving a task from upgrade services component 210, upgrade agent 206 may translate the task into an appropriate API call for deployment manager 204. This process of obtaining and forwarding a current snapshot of a deployment state, and receiving a task for execution at a deployment may repeat as needed to achieve a desired target state of the deployment.

The manner in which tasks are delegated or assigned by the upgrade services component 210 to the upgrade agent 206 may be governed by a deployment plan set forth in the upgrade services component 210. In some embodiments, the deployment plan may define or otherwise set forth an aforementioned target state for a particular deployment, in this example, deployment 202. The target state, as set forth in the deployment plan, can be met by an ordered series of the aforementioned tasks.

The ordered series of tasks may comply with various constraints. Constraints can refer to parameters or boundaries within which deployed services may operate. Examples of constraints may include but are not limited to: version constraints, such as indications of minimum, maximum, and/or recommended versions of a particular software or service running on a deployment; and downtime or maintenance constraints, such as limitations regarding if/when/how long a deployment may go down or be taken offline. Still other examples of constraints may include database schema versions, health constraints (e.g., where an upgrade will not be executed unless a deployment is operating in a healthy state), and computing capabilities. It should be noted that various factors may impact the health of a deployment, software, or other product, e.g., heavy usage, call response time, build failures, number of error logs, etc.

In some embodiments, two types of constraints may exist, e.g., a pre-condition constraint, and an invariant constraint. Pre-condition constraints can refer to constraints that must be met/true before an upgrade proceeds. For example, upgrade services component 210 may consider all applicable pre-condition constraints and develop a deployment plan that comports with those pre-condition constraints. In the case of version constraints, for example, upgrade services component 210 may order tasks for upgrading a particular service so that a proper progression of upgrades, e.g., from version 1.0.0 to 1.1.0 to 1.2.0, etc. can occur. Otherwise, a situation may arise where the target state of a deployment is defined as running version 1.2.0, and a direct upgrade from version 1.0.0 to 1.2.0 would break one or more dependencies. Accordingly, a deployment plan may specify that the deployment must be upgraded to version 1.1.0 prior to an upgrade to version 1.2.0. It should be noted that dependency constraints can exist from the perspective of, e.g., a first service that depends on a second service, as well as from the perspective of, e.g., a third service that depends on the first service. Similar to software version constraints, database schema may be encoded as a dependency. A service may advertise its current schema version which indicates the version of a schema it will use to respond to a downstream request. The service may be associated with constraints defining what versions of a database schema it will support, what database schema versions can be upgraded to or form without taking downtime and which will require downtime.

Invariant constraints may refer to constraints that must remain true through the lifetime of an upgrade and/or service lifecycle. For example, in the case of downtime constraints, a particular deployment may be constrained such that it is only able to be taken offline for a finite period, e.g. during an upgrade, or such that it cannot ever be taken offline. Thus, upgrade services component 210 may evaluate these maintenance constraints such that the deployment plan comprises tasks, e.g., upgrade tasks, that do not conflict with these downtime constraints. In some embodiments, the deployment plan may specify rolling upgrade tasks to comport with no-downtime constraints. In the case of data migration or database schema migration, upgrades can be gated to allow a migration to complete.

In particular, a change version deployment plan may specify that a deployment catalog (which identifies those products installed on a deployment, e.g., a subset of published products) should be upgraded to a newer version. In response to upgrade agent 206 transmitting a snapshot of deployment 202 (which is running an older version of the deployment catalog), upgrade services component 210 may transmit a series of tasks to upgrade agent 206 comprising a stop task, a change version task, and a restart task. As noted above, upgrade agent 206 may continuously take snapshots of deployment 202. Upon receiving a snapshot from upgrade agent 206, upgrade services component 210 determines if deployment 202 is already in the process of being upgraded. If so, upgrade services component 210 returns the next task commensurate with the deployment plan.

If deployment 202 is not in the midst of an upgrade, upgrade services component 210 may select another deployment plan to effectuate based on the state of deployment 202. When selecting a new deployment plan, upgrade services component 210 may compile and review an ordered list of prospective deployment plans. In some embodiments, a first prospective deployment plan that passes the applicable constraints/constraint check for deployment 202, e.g., version constraints, maintenance window constraints, etc. may be selected. In particular, upgrade services component 210 may determine if any installation of a product is running a blacklisted version. A blacklisted version or product release can refer to a version that should not be installed, e.g., because a (critical bug) in that version has been detected, either via automated or manual detection. If deployment 202 is running a blacklisted version, upgrade services component 210 may select a version that comports with a roll-off deployment plan meant to remove the blacklisted version. If deployment 202 is not running a blacklisted version, upgrade services component 210 may search for any entities, e.g., deployment 202 or other deployments, that have any pending configuration changes scheduled and/or version upgrades. Moreover, if upgrade services component 210 discovers that any entities have an out-of-date configuration, upgrade services component 210 may select a deployment plan for updating those entities. Further still, upgrade services component 210 can determine if new versions exist for one or more entities, e.g., deployment 202. If so, upgrade services component 210 can determine a deployment plan to execute in order to upgrade the one or more entities to their respective new versions.

Figure 3:
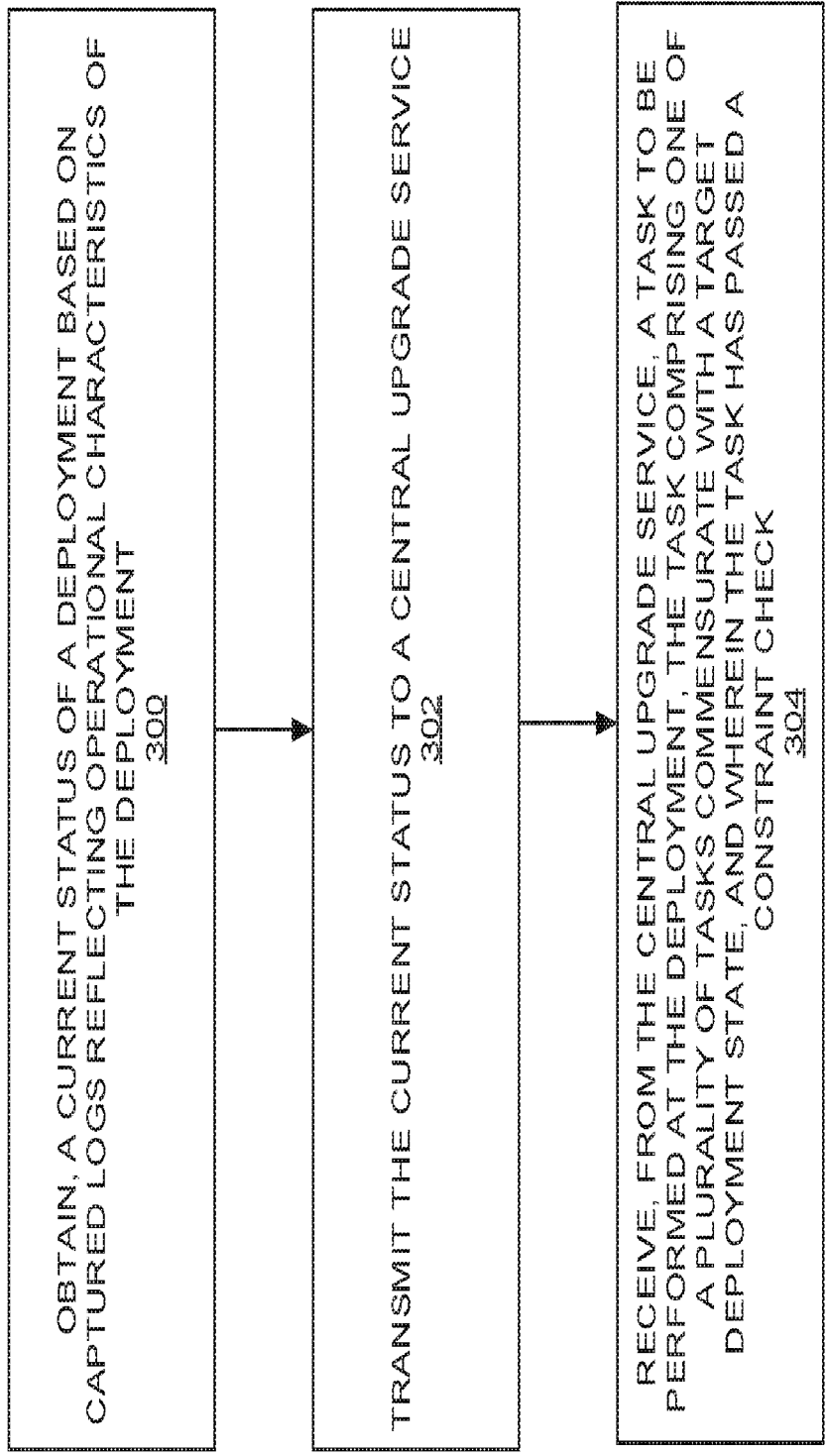
FIG. 3 is a flow chart illustrating example operations that may be performed to achieve constraint-based upgrades in accordance with one embodiment.

FIG. 3 is a flow chart of example operations that may be performed to achieve constraint-based upgrade and deployment in accordance with various embodiments. These example operations are described from the perspective of an upgrade agent, e.g., upgrade agent 206.

As alluded to above, logs reflecting the operational characteristics of a cloud deployment may be captured. As also noted above, logs may be generated by a metrics collector that controls and/or manages a deployment. A deployment manager may be configured to generate logs that comply with one or more specifications such that the logs may be standardized, making them more efficient to process and/or analyze. Logs can be continuously or periodically pushed to an upgrade agent. In this way, relevant data can be kept live and as up-to-date as possible, although in other embodiments, an upgrade agent may continuously or periodically pull or request logs from the deployment manager. For example, the upgrade agent may pull or request logs based on a determined time period or other schedule. In some embodiments, the upgrade agent may pull or request logs when certain events occur, such as when an error or some threshold number of errors occurs, etc.

At operation 300, a current status of the cloud deployment based on the captured logs is obtained. In some embodiments, the upgrade agent may simply consider a currently captured log or set of logs captured within a particular time period deemed to be representative of a current state. In some embodiments, the upgrade agent may analyze the logs to generate a snapshot comprising a set of data points or a report that is representative of the current state. For example, each service or product, associated node, etc. of a deployment (or multiple deployments) may generate a log and sent to the deployment manager, or the deployment manager may generate a log for the service/product, associated node, etc. The upgrade agent may create a snapshot of the deployment vis-à-vis its component products based on a compilation of deployment metadata (associated with the log) provided by the deployment manager.

At operation 302, the current status of the cloud deployment may be transmitted to a central upgrade server. As noted above, the central upgrade server may be its own deployment running upgrade services used for upgrading, installing, changing configurations of products in the cloud deployment. The central upgrade server may run a constraints check to determine any constraints that may be relevant to the cloud deployment, e.g., downtime constraints, version dependencies, health constraints, etc. Depending on the current status of the cloud deployment, and if an upgrade is warranted, the central upgrade server may select a particular deployment plan that comports with the relevant constraints associated with the cloud deployment. In some embodiments, the central upgrade server may select the first of a plurality of deployment plans that comport with the relevant constraints. In some embodiments, the current status of the cloud deployment may warrant a roll-off upgrade to change a product configuration or version that is not allowed to be operative (i.e., a blacklisted version).

The deployment plan selected by the central upgrade server may comprise a plurality of discrete, ordered tasks that can be sent to the upgrade agent. As previously discussed, the deployment plan may define or otherwise set forth an aforementioned target state for a particular deployment. The target state, as set forth in the deployment plan, can be met by the ordered series of tasks. Because discrete tasks are assigned to the upgrade agent, e.g., stop, upgrade, change configuration, start, etc., the upgrade agent can continually capture snapshots of the cloud deployment and provide real-time or near real-time feedback to the central upgrade server. Moreover, the tasks can be ordered so as to comport with any constraints determined through the aforementioned constraints check. Accordingly, at operation 304, a task to be performed at the cloud deployment may be received from the central upgrade server. The task may comprise one of plurality of tasks commensurate with a target deployment state, where the task (as part of a plan) has passed a constraint check.

Figure 4:
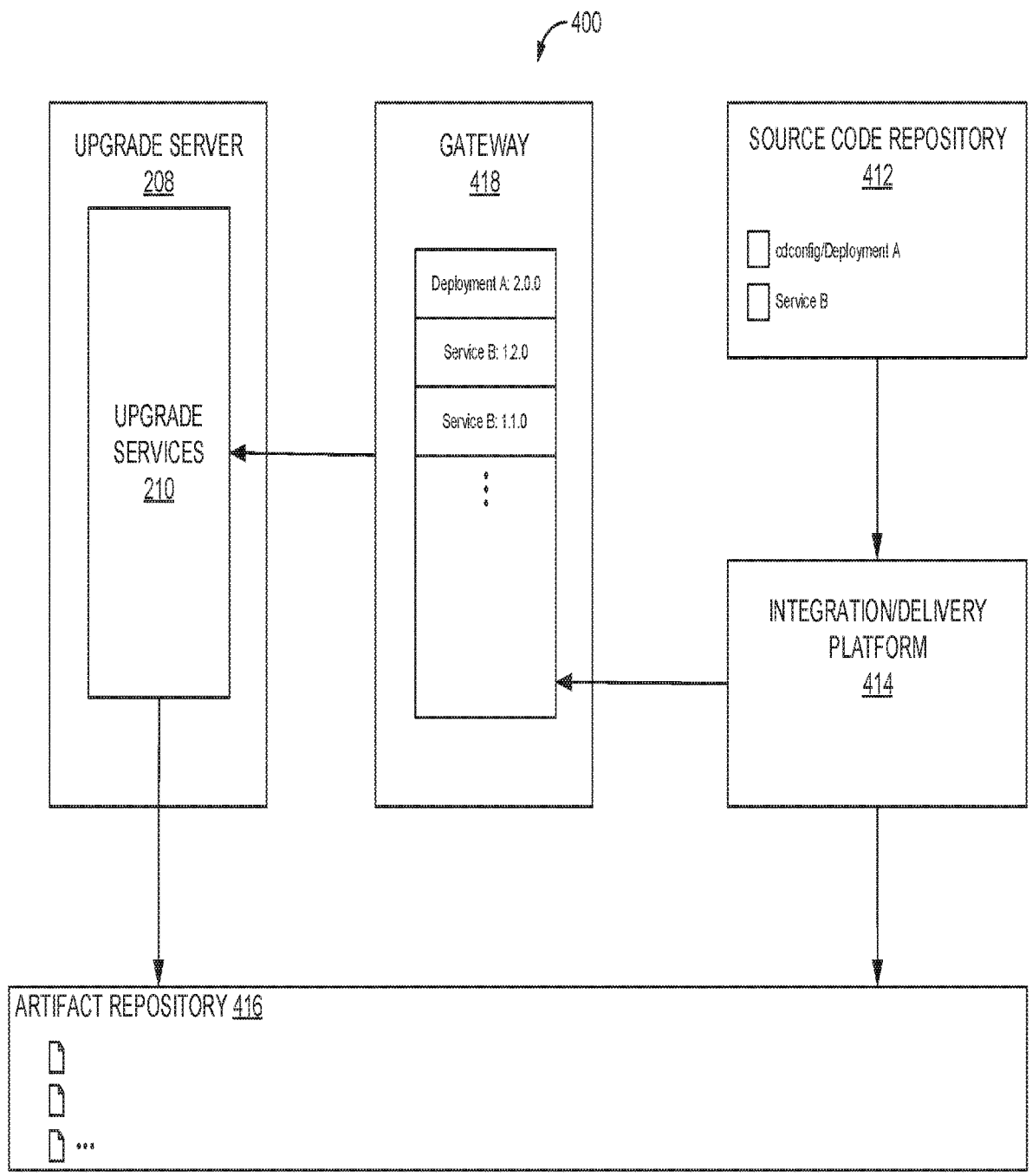
FIG. 4 illustrates an example pipeline for the discovery of new product versions.

The upgrade services component of an upgrade server can discover new products and/or configurations through an upgrade pipeline. FIG. 4 illustrates an example upgrade pipeline 400. Upgrade pipeline 400 may include a source code repository 412. Source code repository 412 may be used for version control and source code management of any versions of a product installed in a deployment. Source code repository 412 may contain one or more relevant configuration files for a product, such as an asset or service being used in a deployment. A user may merge a change to the source code repository 412 for a particular product.

Integration and delivery platform 414 may be a continuous integration and delivery platform that can be used to test builds, debug software, etc., such as service software versions. In particular, integration and delivery platform 414 may build a distribution containing the substance of an artifact or the outcome of a build process that can be stored in an artifact or binary repository. A distribution may contain a compressed version of all configuration files relevant to a configuration change, e.g., the binaries of a service. As indicated above, the binaries may be stored in/published to an artifact repository, e.g., artifact repository 416.

Integration and delivery platform 414 may push an encrypted identifier of the configuration change to a gateway 418 which can provide these configuration changes directly to upgrade services 210 for executing an upgrade, selecting a deployment plan, etc. It should be noted that in some embodiments, the encrypted identifier may pass through a proxy in upgrade server 208 that holds an encryption key. Upon receiving a configuration change, upgrade services component 210 may decrypt the configuration change identifier. Upon doing so, upgrade services component 210 is able to access the artifact repository to download and persist the product or configuration information, etc. It should be noted that any products in a deployment to be managed by upgrade server 208 may be published to upgrade server 208.

In some embodiments a mechanism referred to as a release channel may be used to control the rollout of a particular software release version or product release. A product release can be present in multiple release channels and these release channels need not necessarily have any explicit hierarchy. Deployments, such as deployment 202 (FIG. 2) may subscribe to release channels in order to express their risk tolerance for a given product. Some release channels may contain product releases that are more risky and less stable, while other release channels only contain stable product releases. Depending on the risk tolerance of a deployment, the deployment may subscribe to different types of release channels. An upgrade will occur when there is a product release version newer than the currently deployed version of the product that has all of its product dependencies satisfied and is present in the release channel to which the deployment is subscribed. In some embodiments, a product manifest file can be embedded within each product release which holds information that tells upgrade services component 210 how and when to install a product.

In some embodiments, nodes of a service implemented in a deployment may be upgraded in a rolling or iterative manner, where a first node or set of nodes may be upgraded to a new version, while a remaining node or set of nodes run on a current or existing version. Upgrading only a first node or set of nodes to a newer version allows traffic to be shaped to this first node or set of nodes to ensure healthy operation before continuing with a service-wide upgrade. In order to accommodate different nodes running different versions of a product or service, the nodes may be defined or identified as being in a target service state. A desired target traffic ratio can be set to specify how many nodes of a deployment should be upgraded to the new version and how many nodes of the deployment should be maintained at a current version. In some embodiments, that target ratio may be automatically updated depending on monitored health, historical deployment state, and/or other relevant considerations or criteria, which may be reflected in the collected logs/metrics described above. In some embodiments, a deployment plan may be configured to perform such rolling or iterative upgrades. It should be understood that further upgrades may be stopped or already-upgraded nodes may be rolled back if the monitored health of the already-upgraded nodes falls below a determined threshold, or some other criteria or constraint(s) is not met. It should also be understood that in some embodiments, versions may be automatically deemed to be stable after meeting or passing some minimum threshold, e.g., some length of time during which a node or set of nodes have experienced healthy operation using a new version, or some number of nodes have experienced healthy operation using the new version, etc. It should be understood that stability can be monitored/determined across multiple deployments. Accordingly, in some embodiments, a deployment plan may specify that once such threshold has been met or surpassed, a full upgrade of all remaining nodes in a deployment can proceed without following any target traffic ratio/rolling or iterative upgrade.

As previously described, upgrades in accordance with some embodiments, follow a deployment plan, where tasks making up the deployment plan are sent to an upgrade agent for execution. In the context of rolling or iterative deployment node upgrades, a task can be generated by the upgrade services component instructing the upgrade agent to update a current target traffic ratio, and thereby effectuate upgrading the desired number of nodes.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 5:
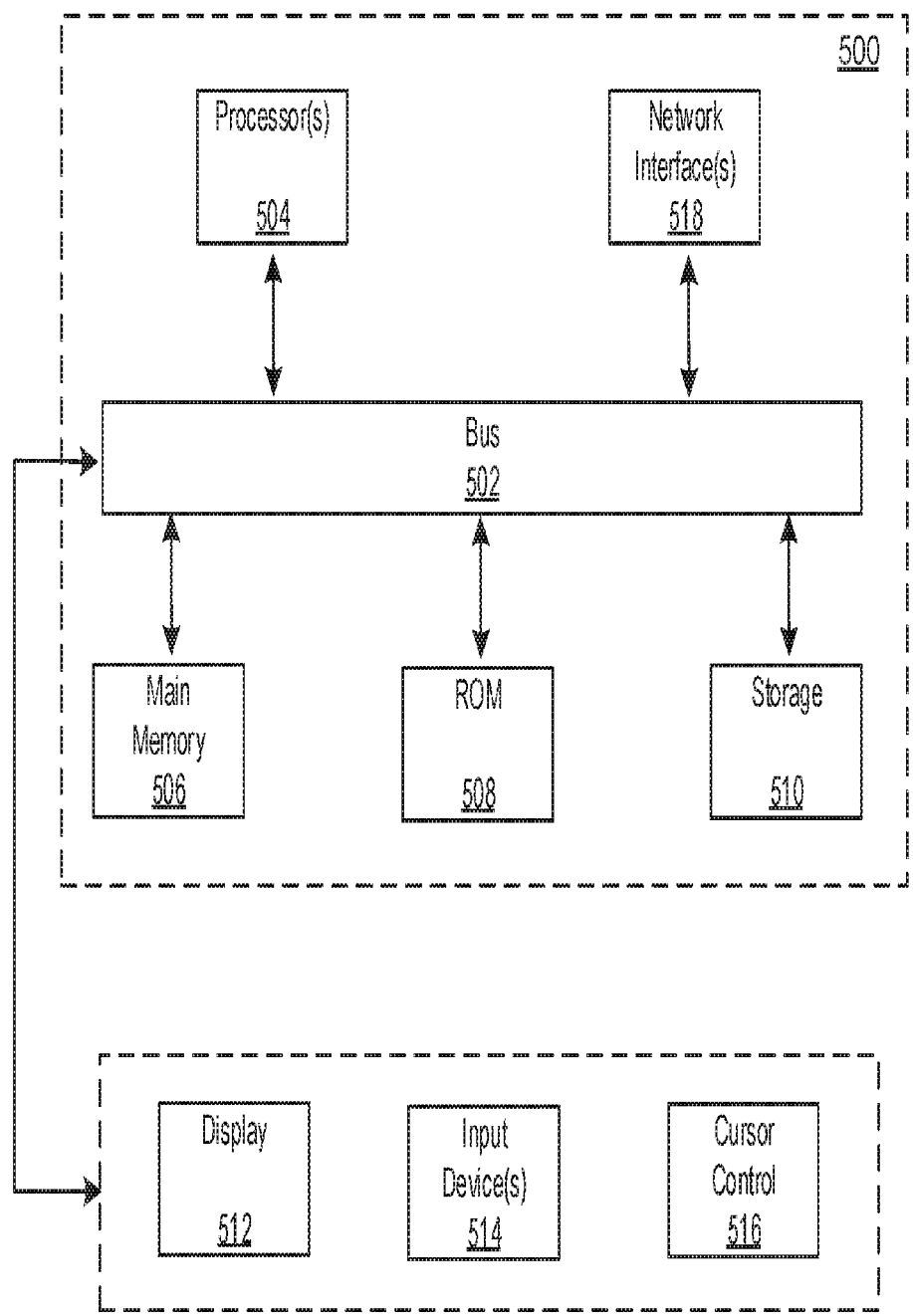
FIG. 5 is a block diagram that illustrates a computer system upon which any of the embodiments described herein may be implemented.

FIG. 5 depicts a block diagram of an example computer system 500 in which any of the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a cathode ray tube (CRT) or LCD display (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 500 may include a user interface component to implement a GUI that may be stored in a mass storage device as executable software codes that are executed by the computing device(s). This and other components may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," as used herein, refers to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors. The components or computing device functionality described herein are preferably implemented as software components, but may be represented in hardware or firmware. Generally, the components described herein refer to logical components that may be combined with other components or divided into sub-components despite their physical organization or storage.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may retrieves and executes the instructions. The instructions received by main memory 506 may optionally be stored on storage device 510 either before or after execution by processor 504.

The computer system 500 also includes a communication interface 518 coupled to bus 502. Network interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, network interface 518 may be a local area network (LAN) card to provide a data communication connection to a compatible LAN (or WAN component to communicated with a WAN). Wireless links may also be implemented. In any such implementation, network interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code components executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

The invention claimed is:

1. A system comprising:
    a central server configured to coordinate tasks across different deployments; and an agent to perform one or more tasks at a particular deployment, the one or more tasks comprising obtaining one or more snapshots indicating a level of health of the particular deployment, generating a report based on the obtained one or more snapshots, and transmitting the report to the central server, wherein the central server comprises: one or more processors; and memory storing instructions that, when executed by the one or more processors, cause the central server to: receive a subscription from the particular deployment to a particular release channel, wherein the subscription indicates eligibilities of nodes to upgrade within the particular deployment of upgrading when an update in the particular release channel occurs, and the subscription indicates non-eligibilities of any nodes that are unsubscribed to the particular release channel; determine whether a different product release version compared to a currently deployed version of the product is available, within the particular release channel, that satisfies a particular level of health stability of the particular release channel, wherein the determining of whether the different product release version is available comprises: determining that the different product release version from the currently deployed version previously failed to satisfy the particular level of health and is stability and satisfied a lower level of stability; determining that the different product release version has been promoted from the lower level of stability to the particular level of stability based on levels of health associated with other deployments that have been upgraded with the different product release version;
    in response to determining that the different product release version is available:
        upgrade a first selected proportion of the subscribed nodes from the particular deployment; generate the report based on upgrade statuses of the deployment, wherein the upgrade statuses indicate whether each of the subscribed nodes have been upgraded and health levels of each of the subscribed nodes; and based on the report, selectively upgrade a second selected proportion of the subscribed nodes within the particular deployment according to the different product release version in response to determining that the different product release version compared to the currently deployed version is available, wherein based on the upgrade statuses of one or more other nodes from the particular deployment, wherein at least an unselected proportion of the subscribed nodes maintains the currently deployed version of the product.

2. The system of claim 1, wherein the particular release channel comprises a file that comprises protocol of upgrading to the product release version.

3. The system of claim 1, wherein the selectively upgrading is in response to determining one or more dependencies being satisfied between the particular deployment and a downstream deployment to which the particular deployment responds, the one or more dependencies comprising a compatibility between the particular deployment and the downstream deployment.

4. The system of claim 3, wherein the one or more dependencies comprises a matching schema version between the particular deployment and the downstream deployment.

5. The system of claim 1, wherein the selectively upgrading comprises selecting an upgrade mode that satisfies a downtime constraint of the particular deployment.

6. The system of claim 1, wherein the agent continuously transmits, to the central server, a snapshot of the particular deployment, and the central server, in response to receiving the snapshot of the particular deployment, transmits a series of tasks to the agent.

7. The system of claim 6, wherein the series of tasks comprises a stop task, a change version task, and a restart task.

8. The system of claim 1, wherein the selectively upgrading upgrade of the proportion of the subscribed nodes is based on a utilization level of the particular deployment.

9. The system of claim 1, wherein the selectively upgrading of the proportion of the subscribed nodes is based on a cascaded upgrade from a first version to a second version to a third version, and a direct upgrade from the first version to the third version is disqualified.

10. The system of claim 1, wherein a sum of the first selected proportion and the second selected proportion of the subscribed nodes comprises a subset of the subscribed nodes that is less than an entirety of the subscribed nodes within the particular deployment.

11. The system of claim 1, wherein the determining that the product release version satisfies the particular level of health stability of the particular release channel is based on one or more other deployments that received the product release version satisfying a level of health.

12. The system of claim 1, wherein selectively upgrading the second selected proportion comprises
the proportion comprises a first proportion, and the instructions further cause the agent to:
determine that the particular deployment, following the selectively upgrading of the first selected proportion, satisfies a level of health; and
in response to determining that the particular deployment following the upgrading satisfies the level of health, upgrading the second selected proportion of the subscribed nodes within the particular deployment in a subsequent iteration.

13. The system of claim 1, wherein the particular level of health is based on a level of utilization at the deployment and a response time.

14. The system of claim 1, wherein the determining of whether the newer product release version is available is in response to determining that the currently deployed version has been blacklisted.

15. The system of claim 1, wherein the snapshots are obtained from one or more logs.

16. The system of claim 1, wherein the instructions that, when executed by the one or more processors, cause the central server to:
build a distribution that comprises an outcome of the task, the distribution comprising a compressed version of configuration files corresponding to the task.

17. The system of claim 1, wherein the one or more snapshots comprise a plurality of continuously obtained snapshots, and the report is generated based on the continuously obtained snapshots.

18. The system of claim 1, wherein the selectively upgrading, by the central server, the second selected proportion of nodes comprises adjusting a target traffic ratio indicating the proportion of upgraded nodes, out of all nodes within the particular deployment, based on a monitored health within the particular deployment following the upgrading of the first selected proportion.

19. A computer-implemented method, comprising:
coordinating tasks, by a central server, at different deployments;
performing one or more tasks, by an agent, at a particular deployment, the one or more tasks comprising obtaining one or more snapshots indicating a level of health of the particular deployment, generating a report based on the obtained one or more snapshots, and transmitting the report to the central server;
receiving, by the central server, a subscription from the particular deployment to a particular release channel, wherein the subscription indicates eligibilities of nodes to upgrade within the particular deployment of upgrading when an update in the particular release channel occurs, and the subscription indicates non-eligibilities of any nodes that are unsubscribed to the particular release channel;
determining, by the central server, whether a different product release version compared to a currently deployed version of the product is available, within the particular release channel, that satisfies a particular level of health stability of the particular release channel, wherein the determining of whether the different product release version is available comprises:
determining that the different product release version from the currently deployed version previously failed to satisfy the particular level of health and is stability and satisfied a lower level of stability; determining that the different product release version has been promoted from the lower level of stability to the particular level of stability based on levels of health associated with other deployments that have been upgraded with the different product release version;
in response to determining that the different product release version is available:
upgrade a first selected proportion of the subscribed nodes from the particular deployment;
generate the report based on upgrade statuses of the deployment, wherein the upgrade statuses indicate whether each of the subscribed nodes have been upgraded and health levels of each of the subscribed nodes; and
based on the report, selectively upgrading, by the central server, a second selected proportion of the subscribed nodes within the particular deployment according to the different product release version in response to determining that the different product release version compared to the currently deployed version is available, based on the upgrade statuses of one or more other nodes from the particular deployment.

* * * * *